(12) United States Patent
Minton-Edison et al.

(10) Patent No.: US 9,193,605 B2
(45) Date of Patent: Nov. 24, 2015

(54) GRAVITY POWERED LIQUID PURIFICATION SYSTEM

(75) Inventors: Doug Minton-Edison, Eugene, OR (US); Sue Minton-Edison, Eugene, OR (US)

(73) Assignee: Environmental Safety Products Limited, Eugene, OR (US)

( * ) Notice: Subject to any disclaimer, the term of this patent is extended or adjusted under 35 U.S.C. 154(b) by 509 days.

(21) Appl. No.: 13/452,567

(22) Filed: Apr. 20, 2012

(65) Prior Publication Data

US 2012/0267314 A1    Oct. 25, 2012

Related U.S. Application Data

(60) Provisional application No. 61/477,569, filed on Apr. 20, 2011.

(51) Int. Cl.
*B01D 35/06* (2006.01)
*C02F 1/00* (2006.01)
*C02F 1/44* (2006.01)
*C02F 1/28* (2006.01)
*B01D 35/027* (2006.01)

(52) U.S. Cl.
CPC .................. *C02F 1/002* (2013.01); *C02F 1/281* (2013.01); *C02F 1/44* (2013.01); *B01D 35/0276* (2013.01); *C02F 1/288* (2013.01); *C02F 2201/004* (2013.01); *C02F 2303/04* (2013.01); *C02F 2303/24* (2013.01); *C02F 2305/08* (2013.01)

(58) Field of Classification Search
CPC .......... C02F 1/002; C02F 1/003; C02F 1/281; C02F 1/288; C02F 1/725; C02F 9/005; C02F 2201/006; C02F 2305/08; C02F 2303/04; C02F 2303/24; C02F 2201/004; B01D 35/0276
See application file for complete search history.

(56) References Cited

U.S. PATENT DOCUMENTS

| | | | | |
|---|---|---|---|---|
| 5,443,735 A | * | 8/1995 | Kirnbauer et al. | 210/668 |
| 6,248,244 B1 | * | 6/2001 | Dann | 210/764 |
| 6,589,421 B1 | * | 7/2003 | Nova | 210/257.1 |
| 7,601,262 B1 | * | 10/2009 | Tepper et al. | 210/502.1 |
| 2010/0006508 A1 | * | 1/2010 | Mitchell et al. | 210/669 |

* cited by examiner

*Primary Examiner* — Matthew O Savage
(74) *Attorney, Agent, or Firm* — Terrence J. Edwards; TechLaw Ventures, PLLC (57) ABSTRACT

A non-pressurized or low pressure, gravity flow system and method for filtering, purifying or otherwise removing contaminants from water to create potable water is disclosed. The filters of the disclosure may be used in non-pressurized, low pressure, gravity flow, pour through or manually pressurized devices and may comprise a membrane having a metallic material, such as a nanoalumina fiber material, grafted onto microglass structural fibers.

19 Claims, 10 Drawing Sheets

GRAVITY POWERED LIQUID PURIFICATION SYSTEM

CROSS-REFERENCE TO RELATED APPLICATIONS

This application claims the benefit of U.S. Provisional Application No. 61/477,569, filed Apr. 20, 2011, which is hereby incorporated by reference herein in its entirety, including, but not limited to, those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

The disclosure relates generally to liquid purification systems and methods, and more particularly, but not necessarily entirely, to gravity fed liquid purification systems and methods comprising a hydrophillic filter using a material having metallic fibers, such as nanoalumina fibers, grafted to microglass fibers to create an electromagnetic field to remove a variety of contaminants, including pathogens, microorganisms, cysts, bacteria, viruses and other microbiological contaminants without the use of chemicals, such as chlorine or iodine and without the use of electricity.

Potable water is essential for life. There are many situations that may result in the potable water supply becoming tainted or contaminated causing serious concern for the safety and welfare of individuals who may not have access to potable water. While there are many types of contaminants that can pollute potable water supplies turning those water supplies into non-potable water, microbiological contaminants may be categorized broadly into three categories: viruses, cysts, and bacteria. Natural disasters, such as fires, earthquakes, tsunamis, droughts, flooding, etc., may cause potable water supply sources to become contaminated for one reason or another. Further, in many parts of the world potable water is not readily available, whether due to various natural disaster conditions or for other reasons.

It will be appreciated that in a disaster relief response or in other conditions or environments in which potable water may be difficult to obtain, there is a need to provide potable water. On a large scale basis, such as an earthquake or other natural disaster, this frequently requires that potable water be brought in from other unaffected areas. The response in providing potable water is often slow, costly and it is difficult to distribute to those in the most need of the potable water. In many cases, water may be available and could suffice if adequate water treatment could be performed to remove contaminants including pathogenic organisms and other biological contaminants, such as viruses, cysts, and bacteria, as well as dissolved and suspended organic matter, toxic metals and sediment. Filtering contaminated water and turning it into potable water requires that equipment be brought to the devastated location and operated from a generally centralized location from which potable water may be distributed. While this response may be a viable solution over a protracted period of time, disaster survivors or others located in remote areas may not be able to receive potable water for several days. In other cases due to prohibitive costs, remote location or other factors, it may be difficult to provide potable water to those in need.

It will be appreciated that water treatment and liquid purification systems have other uses beyond natural disasters, such as for camping, hiking, or other activities where water may be available, but is contaminated or potentially contaminated requiring a filtration system. Further, in areas where the water may be potable, but may have some accepted level of contamination, there may be need for a filtration system to aid in filtering the water for taste, smell or otherwise making the water more palatable. In such instances, a liquid filter system may be advantageously used and employed.

For the above reasons, a need exists to provide a simple and effective way to provide potable water to disaster survivors and others who may have water supplies available, but which may be contaminated, during times of need when more elaborate or commercial water treatment systems are not available. Gravity flow water filtration devices have been used in such disaster or other situations in which contaminated water must be purified for potable purposes. However, no single gravity flow water filtration device has the capability to remove all three major categories of biological contaminants, namely viruses, cysts, and bacteria. Instead, gravity fed systems rely on filters in combination with chemicals or other devices to remove viruses, cysts, and bacteria from contaminated water.

Further, membranes having membrane modules, hollow fibers or micro sized openings (pores) have been used to filter contaminated water. Such membranes typically employ a pressure differential to move water through the membrane. The pressure differential may be produced by a pressure-driven system (positive pressure), where each membrane module has a pressure vessel, or a vacuum-driven system (negative pressure), which use hollow fiber modules that are submerged or immersed in an open tank or container. In either case, pressure is required to move water through the membrane. These devices are also easily fouled or clogged by sediment and particulates in the source water, requiring frequent back-washing or replacement and making them ultimately unsuitable for use in extreme conditions.

Because relatively high pressures are required to move water through the filtration membranes and because of their susceptibility to clogging, such membranes have not been successfully employed in combination with gravity flow water filtration devices. Gravity flow water filtration devices are used in situations where power is often not available, thereby requiring gravity flow. Thus, gravity flow filtration devices are simply not capable of producing the pressure needed to pass water molecules through membranes. Without the higher pressures produced by pressure-driven or vacuum-driven systems to push the water through the membrane pores, gravity flow water filtration devices and systems have not been workable to remove all three categories of microbial contaminants. Applicants have discovered a system and method for using a gravity flow filtration system in combination with a filter that may comprise a material or membrane that is capable of producing potable water without the need for high pressure systems or chemicals.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out herein.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the systems and methods for filtering or purifying liquid using a gravity powered filtering system (a non-pressurized filtering system) in combination with a filter comprising a hydrophilic material or membrane having a metallic fibers, such as nanoalumina fibers or other metallic fibers having an electropositive charge, grafted to microglass fibers are disclosed and described, it is to be understood that this disclosure is not limited to the particular embodiments, configurations, process steps, and materials disclosed herein as such embodiments, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

It must be noted that, as used in this specification and the appended claims, the singular forms "a," "an," and "the" include plural referents unless the context clearly dictates otherwise.

In describing and claiming the subject matter of the disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

It will be appreciated that throughout the disclosure, reference may be made to water or liquids in relation to filtration systems and devices that remove contaminants from water or liquids in general. It will be appreciated that the terms "water" and "liquid" should be viewed broadly and may be used interchangeably in this disclosure. The disclosure is intended to include all liquids generally, whether or not the embodiment specifically refers to liquids generally. Thus, an embodiment of a water filtration device or system should be viewed in a more general sense as including any liquid, including water.

Traditional pour through and gravity flow liquid filters may comprise a variety of media, including carbon as well as halogen or ceramic material as a filter, which are designed to remove sediment, dirt, organic matter, cysts and bacteria from water. Other systems require chemicals, such as chlorine or iodine, to remove biological contaminants from the water. Others utilize electricity to power devices such as ultraviolet lights to deactivate microorganisms. The embodiments of the disclosure may eliminate the need for certain halogen or ceramic materials as a filter and may further eliminate the need to use chemicals or electrical devices to remove biological contaminants from liquids. The following disclosure relates to and describes exemplary embodiments of treatment of liquids, e.g., water purifying and water filtration systems.

It will be appreciated that the various embodiments disclosed and described herein are for use in non-pressurized, low pressure, gravity powered applications or systems for moving liquid, such as water, across or through a filter membrane to thereby remove or otherwise eliminate contaminants, including viruses, cysts, and bacteria, from contaminated liquid, such as water, without the use of chemicals or electricity. As used herein, "non-pressurized" means without the use of electrical or manual pressure. Thus, the disclosure may utilize components that are the same as or similar to non-pressurized, low pressure, traditional pour through, and gravity flow liquid filtration devices and systems without departing from the scope of the disclosure.

More specifically, the embodiments of a liquid filtration system of the disclosure may comprise a non-pressurized, low pressure, gravity powered liquid flow system 100 and a filter or filtration material 200 comprising a nanomembrane having an electromagnetic attraction to remove biological contaminants from the liquid. It will be appreciated that biological contaminants may be microorganisms or portions of microorganisms that comprise an overall gram negative charge and may, therefore, be attracted to the gram positive nanomembrane material. The details of the various embodiments of the non-pressurized, low pressure, gravity powered liquid flow system 100 are illustrated in FIGS. 1-13, and the details of the various embodiments of the filter or filtration material 200 comprising a nanomembrane are illustrated in FIGS. 14-17.

It will be appreciated that the containers of the disclosure for housing liquid or water may be stationary or portable and may be any size. The size of the container may be dependent upon whether the filter of the disclosure is located inside or within the container or whether the filter is located in an "in-line" position with respect to the container(s). The containers may also be large enough in size to contain enough water to cover the filter or a portion of the filter when the filter is located inside or within the container. For example, the containers may be bags (waterproof fabric or synthetic), dromedary, backpack, buckets, tubs, cups, reservoirs, or tanks. Other containers also fall within the scope of the disclosure. The following are exemplary embodiments of several containers that may be utilized by the disclosure in conjunction with the filter disclosed herein.

Referring now to FIGS. 1-5, various embodiments of a pour through gravity liquid flow system are illustrated. In a non-pressurized, gravity flow filtration system 100, the system may comprise a first, source water container 110, which comprises the contaminated water, a second, receiving container 120, a filter 130, a mechanical connection 140, such as a bulkhead assembly, located between the first, source container 110 and the second, receiving container 120 to provide fluid communication therebetween, and a spigot or other mechanical release or valve 150 to allow filtered or non-contaminated water to flow from the second, receiving container 120.

Figures 1, 1A:
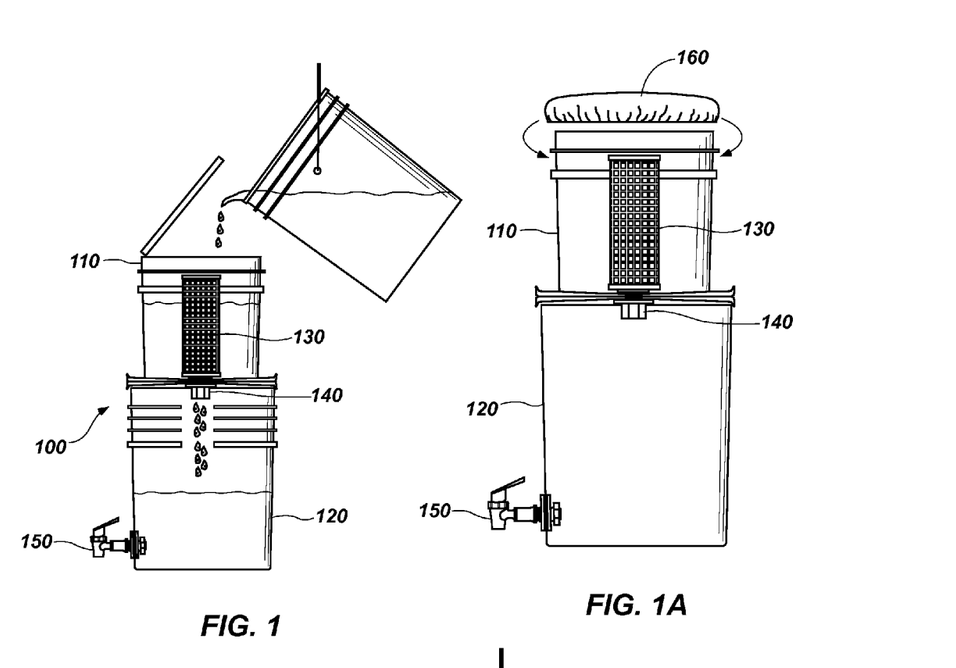
FIGS. 1-5 illustrate various embodiments of a pour through gravity liquid flow system made in accordance with the principles of the disclosure.
Figure 1B:
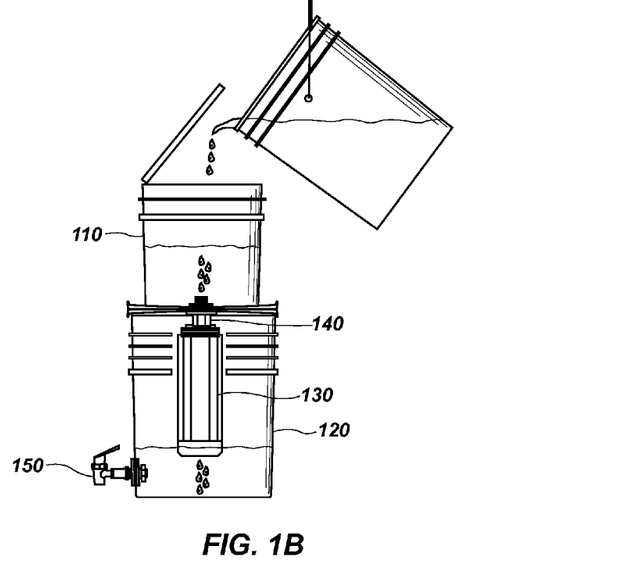

It will be appreciated that the contaminated water should be screened to filter larger debris or sediment using a pre-screen device 160 to pre-filter the water/liquid as it enters the first, source water container 110 or the water/liquid should otherwise be cleaned to whatever extent possible before adding the contaminated water to the source water container 110 for further filtering using the filter 130 of the disclosure (see FIG. 1A). The system may include a plurality of filters, wherein at least one pre-screen device or filter is located in the first container 110 and, in an exemplary embodiment, one or more filters 130 may be located either in the first container 110 and/or the second container 120 (see FIG. 3A). As illustrated in FIG. 3A, the system may further comprise a second filter 132 that is located inside of the second container 120. As further illustrated in the figure, the first container 110 may be attached to the second container 120 with a bulkhead assembly 140, such that liquid that passes through and exits the filter 130 and enters directly into the second filter and then into the second container 120. The bulkhead assembly 140 may comprise a first mechanical attachment structure, such as a pipe or tubular member that may be threaded, that is in mechanical communication with the filter media and a second mechanical attachment structure, such as a nut and/or a gasket, that is in mechanical communication with the outlet of the first container as illustrated in FIG. 3A. The pre-screen device 160, whether a separate filter from filter 130, which employs the filter media described more fully herein, or other pre-screen device, may comprise a plurality of pores that are large enough for liquid to easily flow therethrough, but are small enough to capture larger particulates and debris to allow micro filtering of bacteria, viruses and cysts/spheres to occur in filter 130.

The source water container 110 may be referred to as a "suspect water container"; a "raw water supply container"; or an "untreated water container." As illustrated specifically in FIGS. 1 and 1A, contaminated water, which may contain one or more of the three major categories of biological contaminants, namely viruses, cysts, and bacteria, may literally be poured into the source water container 110 from a bucket or any other mechanism to begin the filtering process.

It will be appreciated that the pressure of gravity may force the water to flow from a container (bag, dromedary, bucket, tub, drum, cup, cistern, reservoir, tank, etc., of any size) through the filter of the disclosure and then to an exit in the container. It will be appreciated that a first container, such as the source water container 110, may be located in or at a position, with respect to a second container, such as the receiving container 120, that is elevated or raised higher than the second container. The positioning of the first container 110 with respect to the second container 120 allows gravitational forces to be exerted on the water/liquid located in the first container 110. Gravity exerts enough force causing the water/liquid to flow through the filter 130, utilizing the membrane or material of the disclosure, and into the second container 120. It will be appreciated that, in an embodiment, the first container 110 may be subject to atmospheric pressure and atmospheric conditions, such that it may experience localized, gravitational forces and atmospheric conditions such as pressure, temperature, humidity, wind, and any other atmospheric condition.

However, while the source water container 110 may be substantially elevated above the receiving container 120 used to receive the filtered, potable water, it does not need to be substantially elevated, or elevated at all, above the receiving container 120. The filter device 130 of the disclosure only requires a minimal amount of pressure to operate. The low pressure needed for the filtering operation comes from the gravitational forces acting on the mass of the water in the source container 110. As long as the water in the source container 110 has a higher mass than the water in the receiving container 120, then water will be continually pushed through the filtration device 130. When the mass of the water in the source container 110 is equal to the mass of the water in the receiving container 120 equilibrium will occur, unless there is a height differential therebetween in which case the flow rate will depend, at least in part, upon that height differential.

More specifically, the flow rate of the liquid through the filter 130 will depend upon the distance between the height level of the liquid in the source container 110 versus the height level of the liquid in the receiving container 120 (illustrated best in FIG. 4), where the flow rate increases proportionally as the distance in height increases. This is referred to as "head pressure." For the reasons that follow, the head pressure of the disclosure may be very low because of the properties and characteristics of the filtration material utilized by the disclosure.

It will be appreciated that a ratio may exist between the flow rate of liquid through the filter media to surface area of said filter media, holding head pressure constant, that may be between a range of about $7.0^{-5}$ gallons per minute/square inch (0.000070 gallons per minute/square inch) to about $2.4^{-4}$ gallons per minute/square inch (0.000240) gallons per minute/square inch).

The liquid that flows through the filter 130 may be at a flow rate that is between a range of about $2.5^{-2}$ gallons per minute (0.025 gallons per minute) to about $1.1^{-1}$ gallons per minute (0.11 gallons per minute).

As an exemplary embodiment, in instances where the first container 110 is a two gallon container and the filter 130 is located within the first container 110, it will be appreciated that the liquid may flow through the filter 130 at a flow rate that is between a range of about $2.5^{-2}$ gallons per minute (0.025 gallons per minute) to about $6.0^{-2}$ gallons per minute (0.060 gallons per minute), or between a range of about $3.13^{-2}$ gallons per minute (0.0313 gallons per minute) to about $4.69°$ gallons per minute (0.0469 gallons per minute), wherein the flow rate increases proportionally with increased volume and weight of a column of liquid within the first container 110. It will be appreciated that the column of liquid may be defined by a cross-sectional area of an exit or outlet of the first container 110.

As an exemplary embodiment, in instances where the first container 110 is a five gallon container and the filter 130 is located within said first container 110, it will be appreciated that the liquid may flow through the filter 130 at a flow rate that is between a range of about $8.5^{-2}$ gallons per minute (0.085 gallons per minute) to about $1.1^{-1}$ gallons per minute (0.110 gallons per minute), or between a range of about $9.18^{-2}$ gallons per minute (0.0918 gallons per minute) to about $9.57^{-2}$ gallons per minute (0.0957 gallons per minute) wherein the flow rate increases proportionally with increased volume and weight of a column of liquid within the first container 110. It will be appreciated that the column of liquid may be defined by a cross-sectional area of an exit or outlet of the first container 110.

The filter 130 utilized by the disclosure may filter water or liquid with a pressure that is less than one (1) pound per square inch (psi), and may even be less than one-half (0.5) psi, though higher pressures may be accommodated as well, without departing from the spirit or scope of the disclosure. For example, the filter 130 may operate with a liquid pressure that may be within a range from less than one-half (0.5) psi to about ten (10) psi, or the pressure may be within a range from less than one-half (0.5) psi to about twenty-five (25) psi, or the pressure may be within a range from less than one-half (0.5) psi to about fifty (50) psi, or the pressure may be within a range from less than one-half (0.5) psi to about one-hundred (100) psi, without departing from the spirit or scope of the disclosure.

Figure 2:
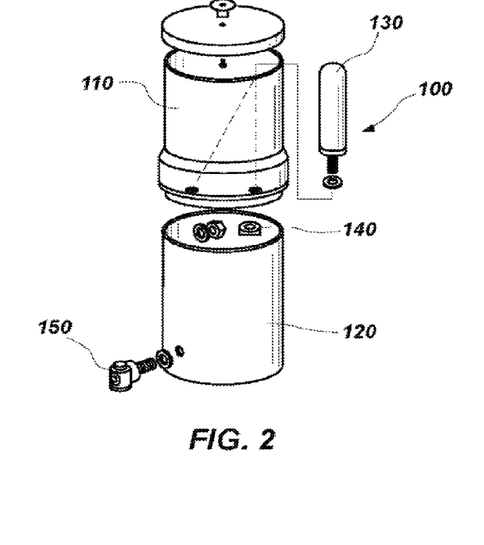
Figure 4:
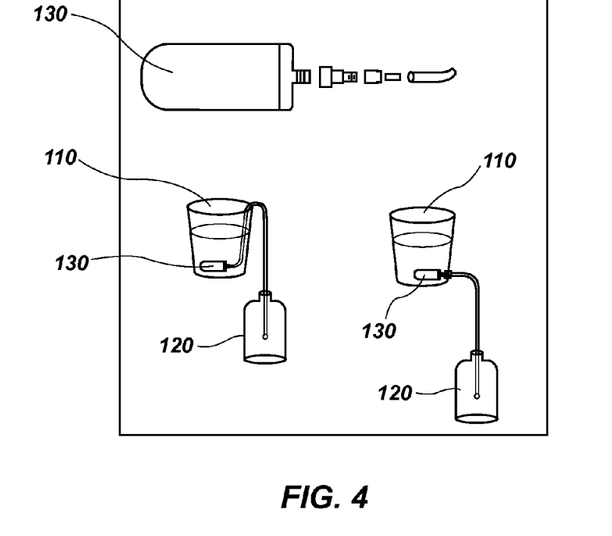
Figure 4A:
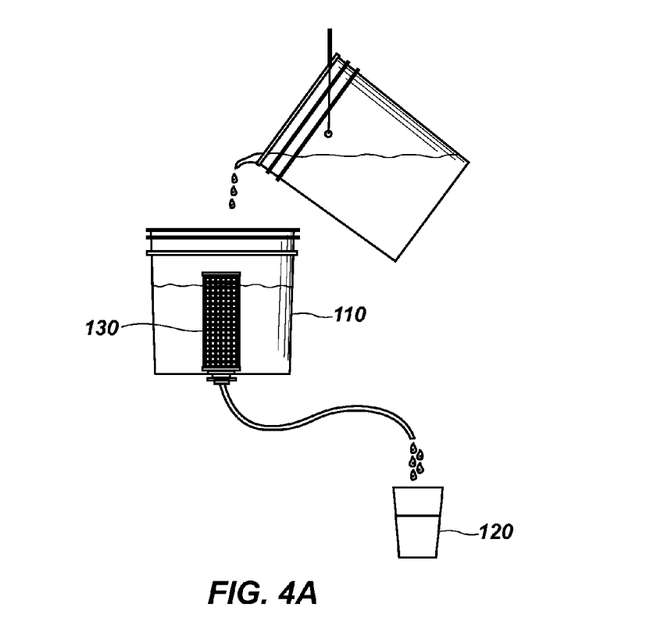
Figure 4B:
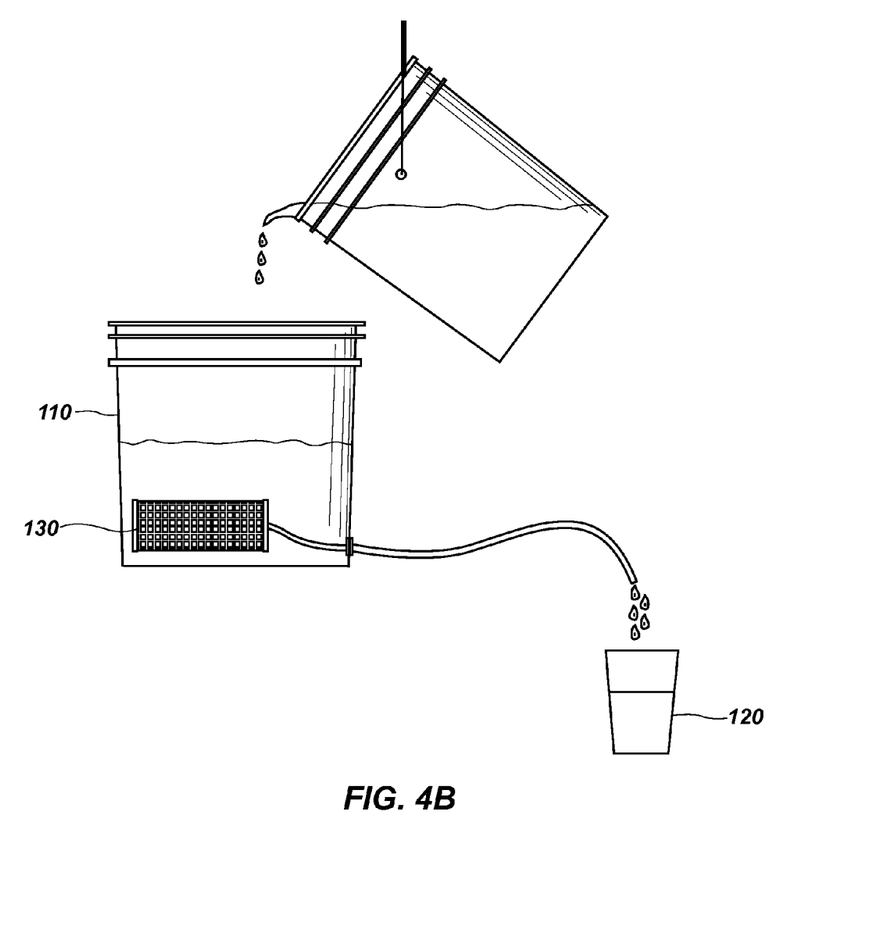
Figure 5:
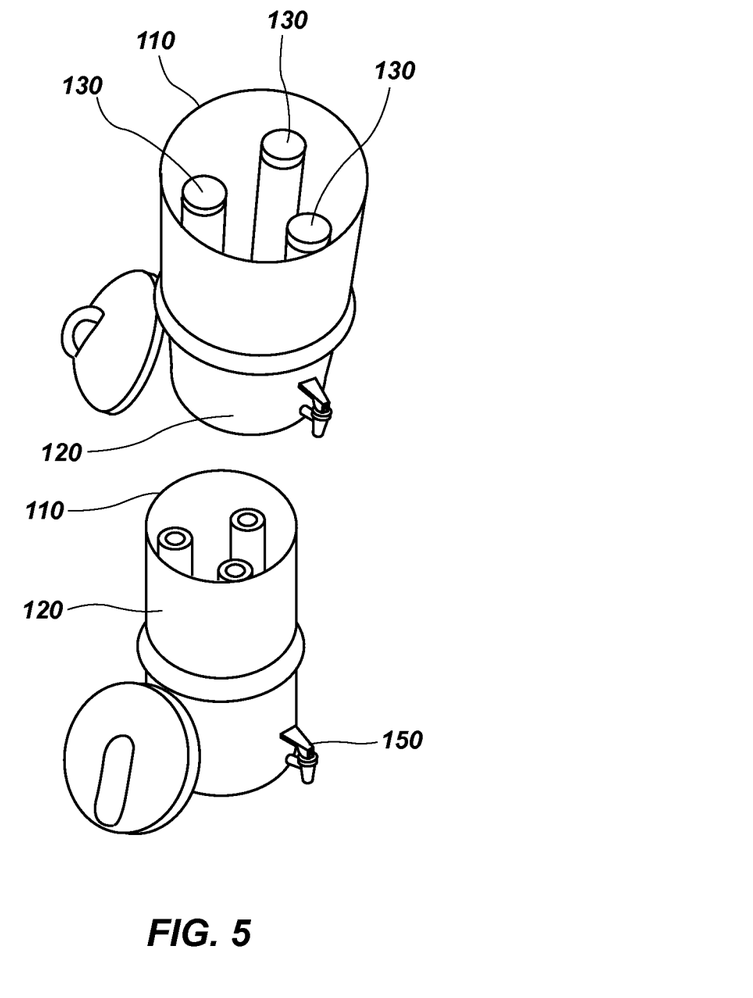
Figures 6A, 6B, 6C, 6D, 6E:
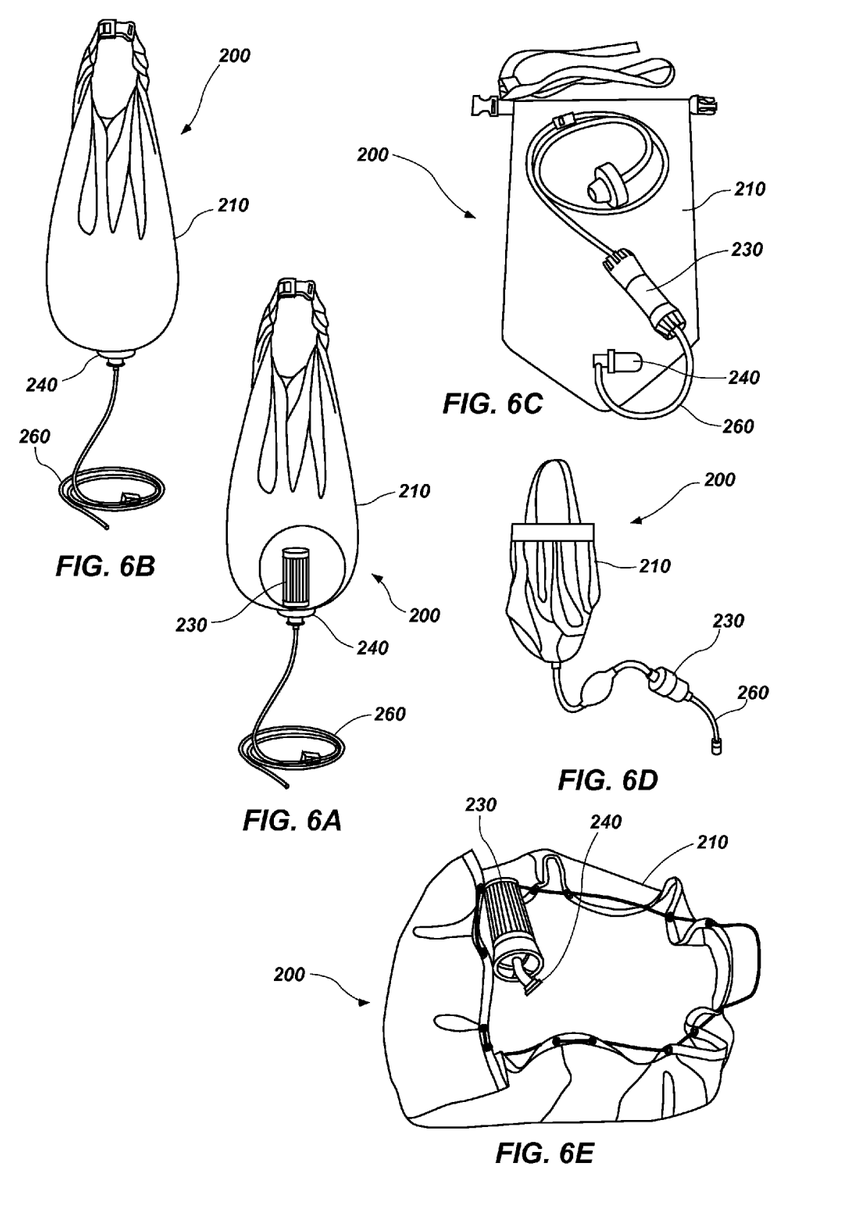
FIGS. 6A-6E illustrate various embodiments of a gravity flow filtration system using a bag as a container made in accordance with the principles of the disclosure.

FIGS. 2, 4 and 5 illustrate embodiments of a pour through gravity filtration system 100 and system configurations. The system configurations and connection assemblies in the embodiments illustrated may be utilized by the disclosure and such system configurations and connection assemblies may be used in conjunction with the filter 130 and filter media described and disclosed herein without departing from the spirit or scope of the disclosure. It will also be appreciated that the filter 130 or plurality of filters 130 of the disclosure, may utilize the filter media disclosed more fully below or may be a ceramic filter 130 or a plurality of ceramic filters 130. It will be appreciated that the ceramic filter may be used in conjunction with the filter media disclosed herein (see discussion regarding FIGS. 17-20) without departing from the scope of the disclosure.

Figure 3:
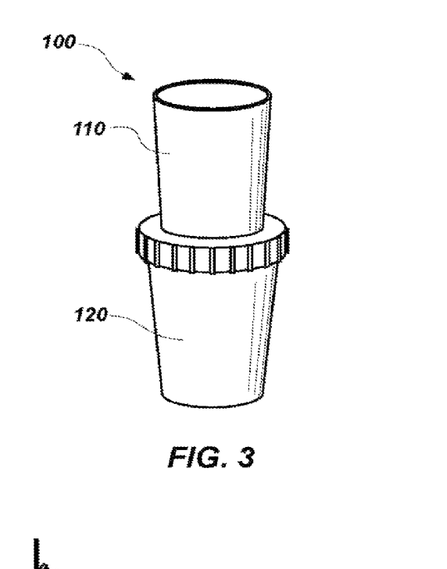
Figure 3A:
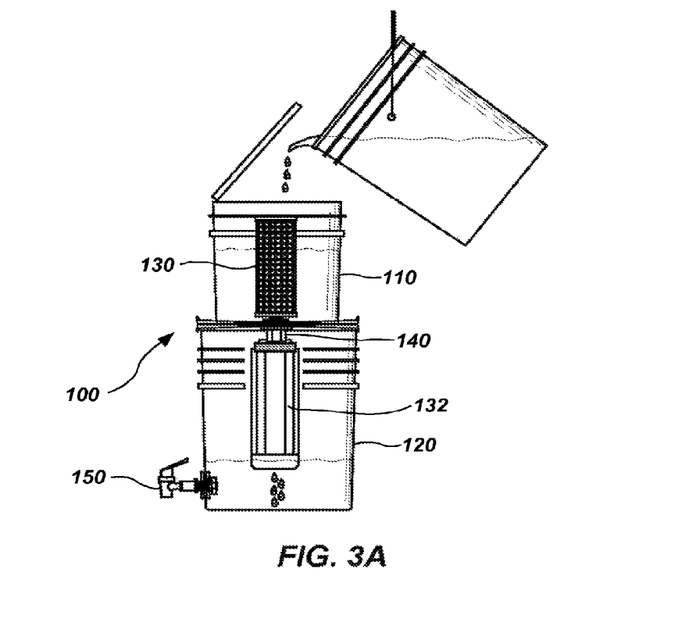

FIG. 3 illustrates an embodiment of a pour through gravity filtration system 100, wherein the system 100 uses a travel cup pour through device, which may be used in conjunction with the filter 130. It will be appreciated that the ceramic filter (for instance) may be used in conjunction with the filter media disclosed herein without departing from the scope of the disclosure.

Referring now to FIGS. 6A-6E, various embodiments of a gravity flow filtration system 200 using a bag as a container 210 are illustrated. The gravity flow filtration system 200 of FIGS. 6A-6B may comprise a filter 230 having the filter media disclosed herein located inside of the bag or container 210. The filter 230 may be attached to the mechanical connection or bulkhead assembly 240, which may be attached to an exit tube 260, as illustrated best in FIG. 6A. The size of the bags or containers 210 may vary. Examples of sizes that may be implemented include bags that contain approximately 1 gallon to about 5 gallons. It will be appreciated that any size bag may be implemented without departing from the scope of the disclosure. The bags or containers 210 may filter liquids at a rate of about 0.5 to about 1 liter per minute. The gravity flow filtration system of FIGS. 6C-6E may include all of the features of the other bag embodiments, but the filter 230 may be housed or connected to other components of the filtration system 200 in an "in-line" manner.

In the case of an inline filter, the pressure of gravity may force the water to flow from the container and then through the filter of the disclosure, which may be attached "inline" and outside of the container. After filtration occurs, the water may then flow into a gathering device, a delivery device, another filter or into a variety of other devices to be stored, delivered or consumed. The filter may be affixed to the bottom or wall of the container by a fitting (either screw, press, barb, quick-connect, etc.) that penetrates through the container and allows purified water to flow out of the container. Alternatively, the filter may rest inside of the container (and may not be attached to the container itself) with tubing or a similar flow device extending through the container via direct penetration or the filter may be configured to allow water flow directly out of the container—up and over the wall.

The inline flow of water/liquid may occur from the untreated water container, where water flows from the container via a tube (pipe, fitting or other similar flow device), through the filter and into a clean, purified water container. In such an inline system, the filter may be affixed to a tube and between to the untreated water container and the clean, purified water container. The filter is said to be housed "in-line," where the water flows through the filter and then out of the filter, such that the purified water may be captured by, or the flow directed into, another device or may be directly consumed by a user.

Figure 7:
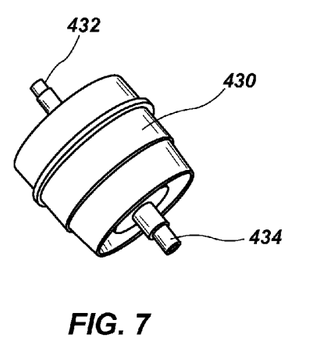
FIGS. 7-9A illustrate various embodiments of an in-line filtration device employed in a post-container location made in accordance with the principles of the disclosure.
Figure 8:
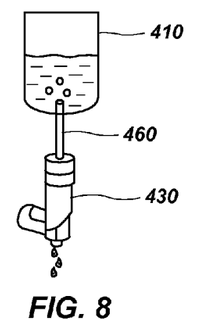
Figure 9:
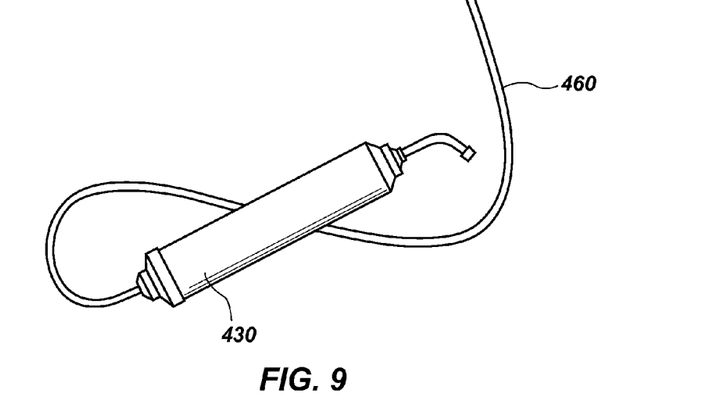

Referring now to FIGS. 7-9, various embodiments of an in-line filtration device employed in a post-container location are illustrated. FIG. 7 illustrates an in-line filter 430 that may utilize the filter media disclosed herein. The in-line filter 430 of FIG. 7 may comprise a push-on fitting allowing tubing to slide over the ends 432 and 434, which may be barb type fittings or other fittings capable of attaching to a tubular member. The tubular member attached to end 432 would then be connected to a container (not illustrated). A second tubular member may be attached to end 434 and may be used as an exit point for the filtered effluent.

Figure 8A:
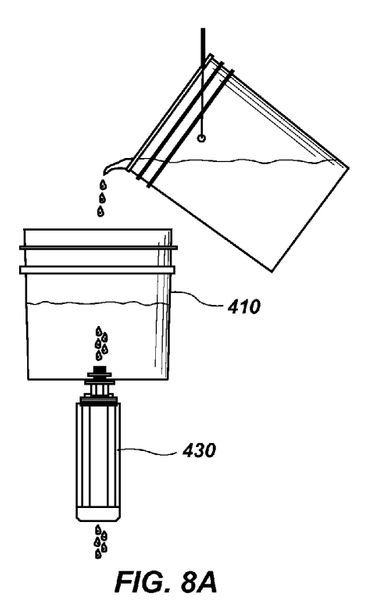
Figure 8B:
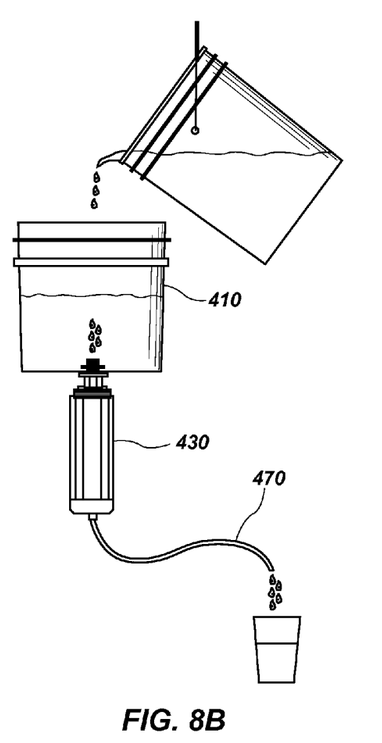
Figure 9A:
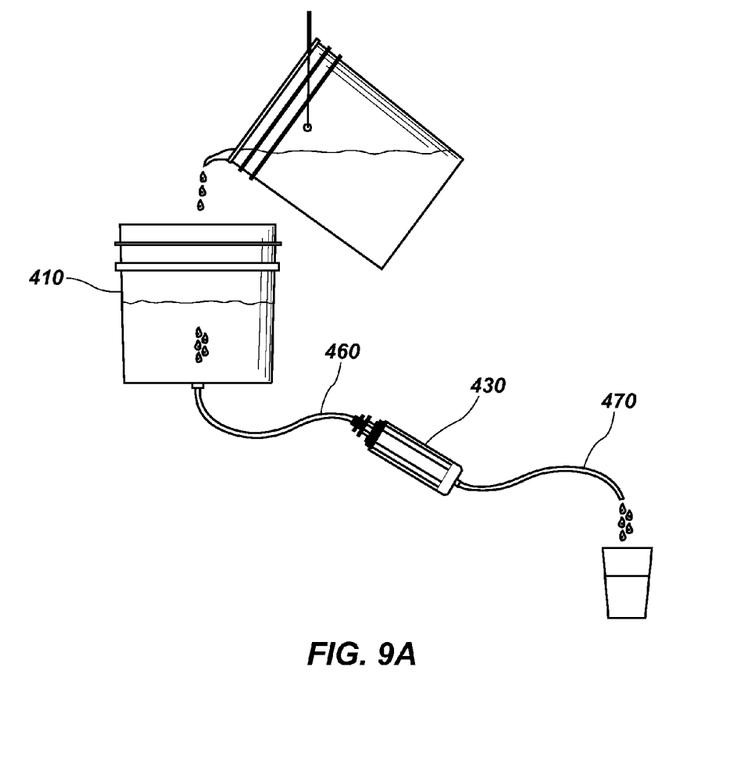

FIGS. 8, 8A and 8B illustrate another embodiment of an in-line filter 430 attached to the container 410 by a bulkhead fitting or a first tube 460 that is fed by liquid from the container 410. It will be appreciated that a second tube 470 may be used to take effluent from the filter 430 to a separate container for use by a user. FIGS. 9 and 9A illustrate examples of another in-line filter 430 that may include the filter media of the disclosure that also utilize one or more tubes 460 and 470 to move liquid from a container through the filter 430 and into a separate container for use by a user.

Figure 10:
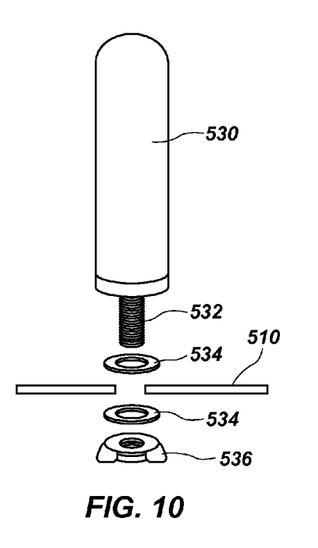
FIGS. 10-13 illustrate various embodiments of a connection assembly for connecting the filtration device or system to a container, which is made in accordance with the principles of the disclosure.

Referring now to FIGS. 10-13, various embodiments of a connection assembly for connecting the filtration device or system to a container are illustrated. FIG. 10 illustrates a filter 530, such as a filter utilizing the membrane or material of the disclosure or a ceramic filter, having a stem 532 that may penetrate or protrude through the container 510 to which the filter 530 may be attached. The stem 532 may be attached to the container 510 via a gasket fitting or other mechanical closure fastener 536. The stem 532 may have a washer 534 located on each side of the container 510 with a female threaded gasket fitting 536 to receive the threaded stem 532.

Figure 11:
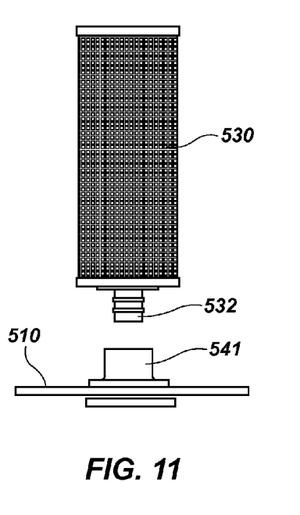
Figure 12:
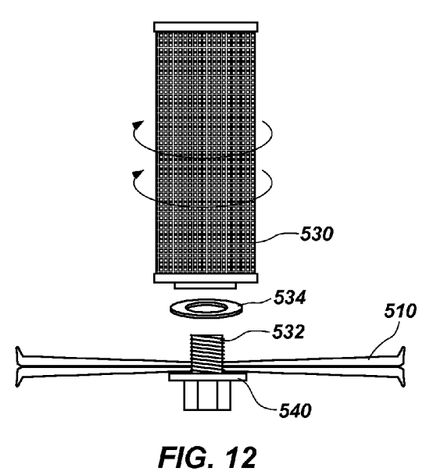
Figure 13:
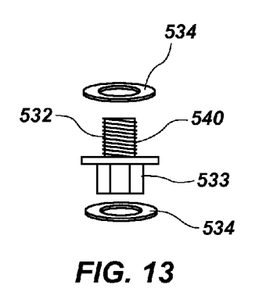
Figure 14:
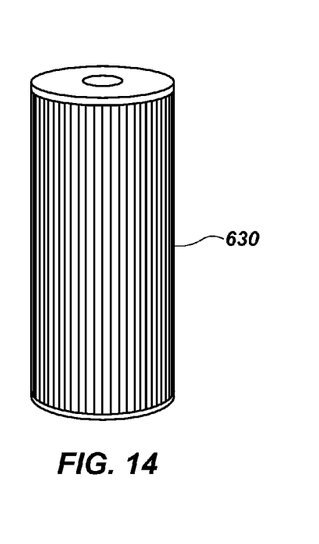
FIGS. 14-17 illustrate various embodiments of the filter made in accordance with the principles of the disclosure.
Figure 15:
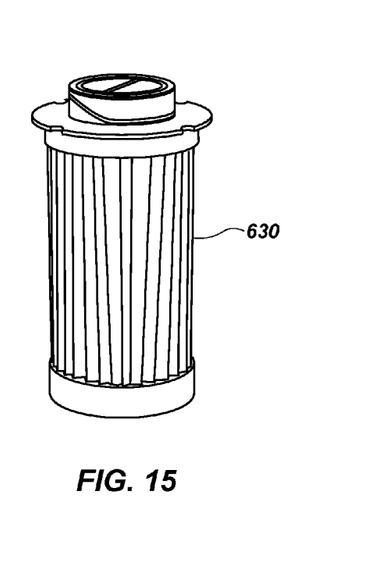
Figure 16:
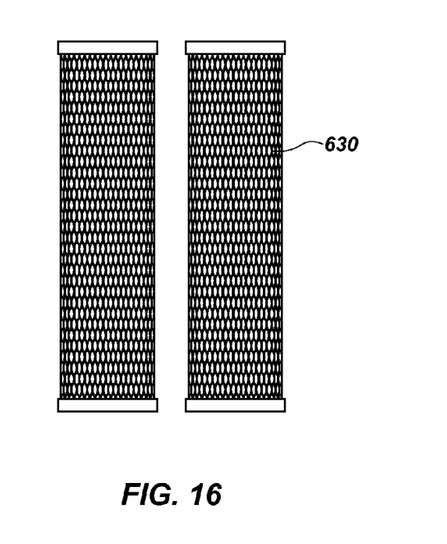
Figure 17:
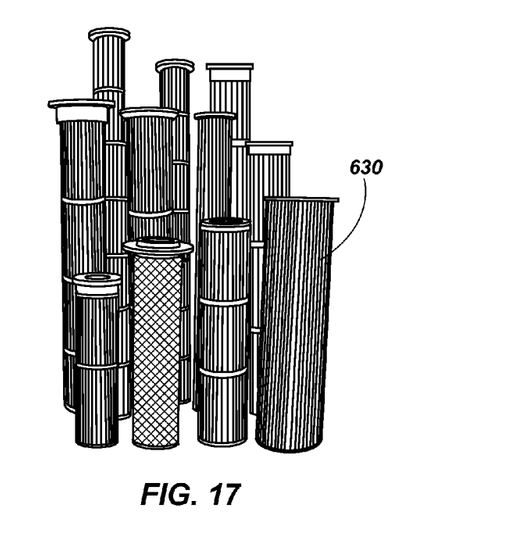

Referring now to FIGS. 11-13, in an embodiment where the filter 530 is connected directly to the container 510, the connection may be via bulkhead fitting 540 having a threaded stem 532 that penetrates the wall or bottom of the container 510, or via a bulkhead fitting 541 that penetrates the container 510. The bulkhead fitting 540 may comprise interior and exterior components that either screw or otherwise fit tightly enough together to compress gaskets or O-rings to avoid bypass. FIGS. 12 and 13 show a unitary bulkhead fitting having a head defining a radial shoulder, a threaded shaft extending axially from the radial shoulder, and an outlet passage extending coaxially through the head and threaded shaft, wherein the radial shoulder bears against a bottom interior surface portion of the upper end wall of the second container surrounding the second opening, and wherein the threaded shaft extends through the second opening of the second container and the first opening of the first container and into the interior of the first container. As shown in FIG. 12, the threaded outlet opening of the bottom end cap is threadedly engaged with the threaded shaft of the bulkhead fitting to attach the bottom end cap of the filter to a bottom interior surface of the bottom wall of the first container.

In FIG. 11, another connection assembly may include a double O-ring seal within a bulkhead fitting 541. To facilitate a direct connection between the filter 530 and the container 510, an embodiment may comprise a tight press fit, where the filter end 532 may be surrounded by a double o-ring to avoid by-pass, and may press firmly into a bulkhead sleeve 541. It will be appreciated that the filter connection may also attach to tubing and can be accomplished in a plurality of different means and methods. The connection to tubing may be dependent on the configuration or embodiment of the filter's, more specifically the filter housing's, outlet port or exit. The tubing may be connected via screw in fittings, barbed fittings, quick-connect fittings or bulkhead fittings. If water is collected directly below the container (where bypass might drip), the connection may be sealed using a tight fit and gaskets or O-rings.

In FIG. 12, another embodiment of a connection assembly is illustrated. In this embodiment, the filter 530 may comprise a female threaded fitting and may be screwed onto a bulkhead fitting 540 having a threaded male stem 532 with a washer or gasket on the inside of the container to fit between the filter 530 and the stem 532 of the bulkhead fitting 540. In FIG. 13, the bulkhead fitting 540 is illustrated as having a slip fitting on an exposed end 533 with a gasket or washer 534 to provide a seal. It will be appreciated that other traditional fittings or connections may be utilized by the disclosure and such fittings are intended to fall within the scope of the disclosure. The above embodiments are provided as examples of the connections or fitting that may be employed by the disclosure.

Referring now to FIGS. 14-17, various embodiments of the filter 630 of the disclosure are illustrated. The filter 630 may be woven, non-woven, pleated, wound, wrapped flat sheet, layered or otherwise designed to increase the surface area of the membrane or material being used, such that contaminants may more readily be captured or removed from the contaminated water as such water passes through the filter 630. It will be appreciated that the filter of the disclosure may comprise a filter media that is designed to remove or capture biological contaminants (microorganisms), which may be present in water and other liquid solutions. The process for removing or capturing biological contaminants (microorganisms) may comprise a material of filter media containing a metallic material or substrate, such as nanoalumina, with dense electropositive charges. As liquid passes through the filter media, the positive charge of the metallic material or substrate attracts negatively charged biological contaminants (microorganisms). The attraction creates a nearly total capture and retention of the biological contaminants (microorganisms), thus removing them from the liquid solution. As noted above, the biological contaminants (microorganisms) may comprise bacteria, cysts, endotoxins or viruses and may be both pathogenic and nonpathogenic in nature.

As a specific example or embodiment, the filter media may be comprised of a mineral containing aluminum, or aluminum in any form, such as nanoalumina fibers, which comprises an electrokinetic charge potential resulting from the exposed aluminum (Al+++) ion on the surface of the nanofibers. For example, the mineral boehmite may be used as a source of the aluminum material. It will be appreciated that boehmite has a chemical formula of AlO(OH), a molecular weight of 59.99 gm, and contains about 44.98% aluminum, 1.68% hydrogen, and about 53.34% oxygen. As liquid passes through the filter media, the positive charge of the exposed aluminum (Al+++) ion attracts negatively charged biological contaminants (microorganisms). The attraction creates a nearly total capture and retention of the biological contaminants (microorganisms), thus removing them from the liquid solution. It will be appreciated that while the mineral boehmite, AlO(OH) (nanoalumina) may be an example of a metallic material that may be utilized in the filter, other metallic materials may also be used as a positively charged ion for attracting negatively charged biological contaminants (microorganisms) and such materials fall within the scope of the disclosure.

The filter of the disclosure may comprise a media of nanoalumina fibers that are grafted onto microglass structural fibers. The combination of nanoalumina fibers and microglass structural fibers may create a fabric like material, which may operate as the filter media. The filter media disclosed and described herein is used to remove the biological contaminants (microorganisms) as well as di-pole particulate matter as a result of a positive charge from water or other liquid solutions.

In an embodiment, the filter of the disclosure may utilize a non-woven, woven, or pleated filter media. The filter media may comprise a thermally-bonded blend of microglass fibers blended with other fibers and infused with metallic fibers, such as nanoalumina fibers, to create a matrix where the pore or inter-spacial opening size can be controlled during web formation. For example, the filter media may comprise a plurality of pores, wherein the filter media comprises a mean pore size that is within a range of about 1 micron to about 2 microns, such that microbiological and other contaminants containing an overall electronegative charge are permitted to enter through the plurality of pores of the filter media and are electrically attracted by the electropositive charge of the nanofibers thereby substantially removing the electronegatively charged contaminants from the liquid passing through the filter media. In such an embodiment, the microglass provides the structure needed for attaching or otherwise affixing the active component of the filter, such as the nanoalumina or other metallic fibers. The filters may use an adsorptive removal process to remove biological contaminants or particles from the contaminated water or liquid. The filter media may comprise nanoalumina boehmite (AlOOH) fibers that may be between a range of about 1 nanometer to about 5 nanometers, or more specifically about 2 nanometers, in diameter (opening). The length of the nanoalumina boehmite may be between a range of about 150 nanometers to about 350 nanometers, or more specifically about 250 nanometers. The nanoalumina fibers may be attached to substrate of microglass structural fibers. Such an embodiment may create a large surface area, e.g., greater than about 42,000 square meters, of nanofibers per square meter of filter media. Because the biological contaminants or particles tend to be electronegatively charged, at a pH of about 7.2, those electronegatively charged contaminants or particles may be attracted by the high zeta potential between the filter media and the contaminant or particle, thereby aiding in the removal process.

The metallic fibers, such as nanoalumina fibers, of the filter media may have an electropositive charge. The electropositive charge may extend upwards to about 1 micron from each nanoalumina fiber to effectively cover the entire 2 micron average pore space of the filter media. Thus, in an embodiment, the electropositive charge of the nanoalumina fibers extend out from the fibers between a range of about 0.50 microns to about 1.5 microns. The filter media may mechanically retain particles that are greater than 0.5 micrometers, but the electropositive charge may also be effective on particles that are less than 0.5 micrometers.

Most filters separate particles by the mechanisms of sieving, inertial impaction, interception and diffusion. The filter media of the disclosure, with its electropositive characteristics, may use adsorption (electro-adhesion) as one of the filtering mechanisms. It will be appreciated that the electropositive fibrous filter media of the disclosure may, when incorporated into a pleated filter, woven filter or non-woven filter, result in a relatively high flow rate.

In an embodiment, the gravity flow filter 630 may comprise a top section or cap having a female threaded cap. The female threaded cap may be attached to an outer shroud that may provide the structure, support and mechanical strength to the assembly and allows for an easy flow of liquids therethrough. The outer shroud may be bonded or otherwise attached to a lower cap at the opposite end of the female threaded cap, which may help the filter media maintain its structural integrity and avoid the liquid from bypassing the filter media. The filter may comprise a pleat pack comprising the filter media, e.g., the nanoalumina fibers grafted to the microglass structural fibers. The pleat pack may comprise a single layer or a plurality of layers of the filter media. In an implementation, the filter may comprise three layers of the filter media, which layers are co-pleated together. In an implementation, the filter may comprise a 2.5 inch by 7 inch filter housing and the filter media may comprise an exterior surface area that is 405 square inches. The filter media may also be in a spiral wound or flat sheet configuration. The filter may also comprise a housing having male threads, a connector or an independent fitting, press fit, straw, mechanical or chemical bond, twist lock or mounting lips or drop in configuration.

It will be appreciated that the filter of the disclosure may utilize other filter media either alone or in combination with the filter media comprising nanoalumina fibers grafted to microglass fibers, and may comprise any combination of materials, such as very fine powders, or nanopowders, for adsorption, oxidation or as catalysts, or ceramic, carbon or kinetic degradation fluxion (KDF) to increase the filter contaminate removal capabilities of the filter.

It will be appreciated that the filter media disclosed herein may be used in conjunction with any of the various embodiments disclosed herein of a container and a connection assembly. Further, it should be noted that the filter media disclosed herein may also be used in conjunction with any low pressure filtration system, whether specifically disclosed herein or not, including filtration systems powered by gravity, that may use a straw to create negative pressure or may be inverted to cause liquid flow through a spout or nozzle.

The following is an example of test results obtained for an embodiment of the liquid filter system disclosed herein in a non-pressurized, gravity fed application using the filter and filter media described and claimed herein comprising a pleat pack of nanoalumina fibers grafted to microglass fibers. The following test was performed by adding a known bacteria from the genus Raoultella, a Group IV virus from the genus Levivirus, and polystyrene microspheres/cysts:

GTW 1 (Clean Water):
Species: Raoultella terrigena Influent: $1.6 \times 10^8$ cfu/100 mL
Species: Raoultella terrigena Effluent: <1 cfu/100 mL (>8.2 log reduction)
Species: Bacteriophage MS2 Influent: $1.8 \times 10^5$ pfu/mL
Species: Bacteriophage MS2 Effluent: <1 pfu/mL (>5.25 log reduction)
Microsphere Influent: $1.6 \times 10^7$ spheres/L
Microsphere Effluent: $<5.0 \times 10^3$ spheres/L (>3.5 log reduction)
GTW 3 (Dirty Water):
Raoultella terrigena Influent: $2.4 \times 10^8$ cfu/100 mL
Raoultella terrigena Effluent: 140 cfu/100 mL (6.23 log reduction)
Bacteriophage MS2 Influent: $1.7 \times 10^5$ pfu/mL
Bacteriophage MS2 Effluent: 3 pfu/mL (4.75 log reduction)
Microsphere Influent: $8.7 \times 10^7$ spheres/L
Microsphere Effluent: $<5.0 \times 10^3$ spheres/L (>4.2 log reduction)

It will be appreciated that the United States EPA purifier standards are understood to be a 6-log reduction for bacteria, 4-log reduction for viruses, and 3-log reduction for cysts/spheres. Thus, in the example above, the embodiment of the liquid filter system performed well above the EPA purifier standards in all three of the major categories using a gravity flow system.

In the foregoing Detailed Description, various features of the disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A gravity powered liquid treatment system comprising:
   a first container for receiving contaminated liquid therein, the first container having an interior, an open top and a bottom wall with a first opening;
   a filter located in the interior of said first container for removing contaminants from the contaminated liquid;
   a second container for receiving liquid that has passed through the filter, wherein the second container has a top wall with a second opening, and wherein the bottom wall of the first container is positioned on top of the top wall of the second container such that the first opening is in vertical alignment with the second opening;
   a unitary bulkhead fitting having a head defining a radial shoulder, a threaded stem extending axially from the radial shoulder, and an outlet passage extending coaxially through the head and threaded stem, wherein the radial shoulder bears against a bottom interior surface portion of the upper end wall of the second container surrounding the second opening, and wherein the threaded stem extends through the second opening of the second container and the first opening of the first container and into the interior of the first container;

wherein the system is a non-pressurized, gravity fed system, such that gravitational forces are exerted on the liquid located in said first container to thereby exert a force causing the liquid to flow through the filter and into said second container;

wherein the first container is subject to atmospheric pressure and atmospheric conditions;

wherein the filter comprises filter media having a tubular shape, a top end cap closing an upper end of the tubular filter media, a bottom end cap closing a bottom end of the tubular filter media, wherein the bottom end cap includes a threaded outlet opening, wherein the threaded outlet opening of the bottom end cap is threadedly engaged with the threaded stem of the bulkhead fitting to attach the bottom end cap of the filter to a bottom interior surface of the bottom wall of the first container, the tubular filter media being formed of a plurality of nanofibers made of a metallic material that are grafted to a plurality of microglass fibers, and wherein the plurality of nanofibers are electropositively charged;

wherein the filter media further comprises a plurality of pores, wherein the filter media comprises a mean pore size that is within a range of about 1 micron to about 2 microns, such that microbiological and other contaminants containing an overall electronegative charge are permitted to enter through the plurality of pores of the filter media and are electrically attracted by the electropositive charge of the nanofibers thereby substantially removing the electronegatively charged contaminants from the liquid passing through the filter media.

2. The system of claim 1, wherein the nanofibers are nanoalumina fibers.

3. The system of claim 2, wherein the electropositive charge of the nanoalumina fibers extend out from said fibers between a range of about 0.50 microns to about 1.5 microns.

4. The system of claim 3, wherein the electropositive charge of the nanoalumina fibers extend about 1.0 micron from said fibers.

5. The system of claim 1, wherein the system further comprises a pre-screen device, wherein contaminated liquid passes through the pre-screen device and into the first container.

6. The system of claim 1, wherein the filter comprises three layers of the filter media, which layers are co-pleated together.

7. The system of claim 6, wherein the filter comprises a 2.5 inch by 7 inch filter housing and the filter media comprises an exterior surface area that is 405 square inches.

8. The system of claim 1, wherein a ratio of the flow rate through the filter media to surface area of said filter media, holding head pressure constant, is between a range of about $7.0 \times 10^{-5}$ gallons per minute/square inch to about $2.4 \times 10^{-4}$ gallons per minute/square inch.

9. The system of claim 1, wherein the liquid flows through the filter at a flow rate that is between a range of about $2.5 \times 10^{-2}$ gallons per minute to about $1.1 \times 10^{-1}$ gallons per minute.

10. The system of claim 1, wherein the first container is a two gallon container, wherein the liquid flows through the filter at a flow rate that is between a range of about $2.5 \times 10^{-2}$ gallons per minute to about gallons per minute, wherein the flow rate increases proportionally with increased volume and weight of a column of liquid within the first container, wherein said column is defined by a cross-sectional area of an exit of the first container.

11. The system of claim 1, wherein the first container is a five gallon container, wherein the liquid flows through the filter at a flow rate that is between a range of about $8.5 \times 10^{-2}$ gallons per minute to about $1.1 \times 10^{-1}$ gallons per minute, wherein the flow rate increases proportionally with increased volume and weight of a column of liquid within the first container, wherein said column is defined by a cross-sectional area of an exit of the first container.

12. The system of claim 1, wherein said metallic material is a mineral containing aluminum.

13. The system of claim 12, wherein the mineral is boehmite.

14. The system of claim 1, said metallic material is alumina, and wherein the combination of the plurality of nanoalumina fibers grafted onto the plurality of microglass structural fibers creates a non-woven fabric material.

15. The system of claim 14, wherein the filter media is pleated.

16. The system of claim 14, wherein the filter media is manufactured into a pleat pack that comprises a plurality of layers of said non-woven fabric material.

17. The system of claim 14, wherein the filter further comprises a catalyst for increasing adsorption and oxidation, and kinetic degradation fluxion (KDF) media to increase the filter contaminate removal capabilities of said filter.

18. The system of claim 1, wherein the filter reduces the amount of bacteria, viruses and cysts from the contaminated liquid to at least a 6-log reduction for bacteria, at least a 4-log reduction for viruses, and at least a 3-log reduction for cysts.

19. The system of claim 1, wherein the nanofibers are nanoalumina fibers comprising an electropositive charge, wherein the electropositive charge of the nanoalumina fibers extend out from said fibers between a range of about 0.50 microns to about 1.5 microns, wherein the system further comprises a pre-screen device, wherein contaminated liquid passes through the pre-screen device and into the first container, wherein the filter media comprises three layers of the filter media, which layers are co-pleated together, wherein the filter comprises a 2.5 inch by 7 inch filter housing and the filter media comprises an exterior surface area that is 405 square inches, wherein a ratio of the flow rate through the filter media to surface area of said filter media, holding head pressure constant, is between a range of about $7.0 \times 10^{-5}$ gallons per minute/square inch to about $2.4 \times 10^{-4}$ gallons per minute/square inch, wherein said metallic material is a mineral containing aluminum, wherein the mineral is boehmite, wherein the combination of the plurality of nanoalumina fibers grafted onto the plurality of microglass structural fibers creates a non-woven fabric material, wherein the filter media is pleated, wherein the filter reduces the amount of bacteria, viruses and cysts from the contaminated liquid to at least a 6-log reduction for bacteria, at least a 4-log reduction for viruses, and at least a 3-log reduction for cysts.

* * * * *